United States Patent [19]
Jakubowski, Jr.

[11] Patent Number: 5,857,647
[45] Date of Patent: Jan. 12, 1999

[54] INTEGRAL ACCUMULATOR VALVE AND RAM ASSEMBLY FOR PNEUMATIC WEAPON EJECTION SYSTEM

[75] Inventor: Thaddeus Jakubowski, Jr., St. Charles, Mo.

[73] Assignee: McDonnell Douglas Corporation, St. Louis, Mo.

[21] Appl. No.: 864,409

[22] Filed: May 28, 1997

[51] Int. Cl.⁶ ..................................................... B64D 1/04
[52] U.S. Cl. ........................ 244/137.4; 89/1.54; 91/468; 60/413; 292/144
[58] Field of Search .................. 244/137.4; 89/1.51, 89/1.54, 1.59; 91/468, 442, 446; 60/413; 292/144

[56] References Cited

U.S. PATENT DOCUMENTS

| | | | |
|---|---|---|---|
| 4,043,525 | 8/1977 | Jakubowski | 244/137.4 |
| 4,347,777 | 9/1982 | Jakubowski | 89/1.58 |
| 5,583,312 | 12/1996 | Jakubowski | 89/1.54 |

*Primary Examiner*—Galen L. Barefoot
*Attorney, Agent, or Firm*—Westerlund & Powell, P.C.; Robert A. Westerlund; Raymond H. J. Powell, Jr.

[57] ABSTRACT

A pneumatic actuation assembly for use in an ejection system capable of unlocking and forcibly ejecting stores from racks mounted on an aircraft or similar weapon carrier. The actuation assembly including a primary valve and release ram attached to one-another for joint, reciprocating movement along a common longitudinal axis between closed and open positions. A solenoid control valve initiates movement of the primary valve by creating a pressure imbalance across the primary valve member. Pressurized gas is caused to vent to the atmosphere, allowing the primary valve member to move the attached release ram into engagement with a mechanism capable of unlocking the hooks before moving thrust pistons to forcibly eject the unlocked stores.

18 Claims, 3 Drawing Sheets

INTEGRAL ACCUMULATOR VALVE AND RAM ASSEMBLY FOR PNEUMATIC WEAPON EJECTION SYSTEM

BACKGROUND OF THE INVENTION

The present invention relates generally to store carriers for carrying a releasable store on an aircraft and, more particularly, to an improved ejection system capable of maximizing the pneumatic force available for ejecting the store while reducing the overall complexity of the ejection system, resulting in enhanced in reliability of operation.

Military aircraft utilize racks located beneath the wings and fuselage to carry and dispense stores upon command. Stores may be used to contain munitions i.e. bombs, or to contain other material to be dropped from the aircraft i.e. rockets or missiles upon command. Typical ejector racks are shown in U.S. Pat. Nos. 4,043,525 and 4,347,777, each issued to the same inventor and assignee of the present invention and incorporated herein by reference.

Conventionally, an ejector rack includes a release mechanism which is activated to mechanically release and subsequently forcibly eject the weapon from the aircraft. Most ejector racks at one time utilized pyrotechnic (explosive) cartridges which, upon ignition, generate high pressure gas for actuating the mechanical release mechanism, as well as providing high pressure gas to forcibly eject the store from the rack mounted on the aircraft.

Ejection systems that employ pyrotechnic cartridges have certain undesirable characteristics. For example, a great deal of cleaning and maintenance is required after firing a pyrotechnic cartridge. When fired, the chemical burning of the explosive charge within the pyrotechnic cartridge results in a large amount of residue being deposited within the system. This residue also contains moisture and corrosives. After burning, the moisture in the system tends to further gather debris, form ice, and otherwise clog the internal and external workings of the bomb rack mechanism. If not properly disassembled and cleaned after a scheduled number of firings, at high cost and a great deal of labor and downtime for the aircraft, an ejection system utilizing pyrotechnic cartridges will quickly corrode and become unreliable.

In order to avoid the inherent problems associated with the pyrotechnic cartridge, the inventor of the present invention devised a unique pneumatic ejector rack assembly set forth in U.S. Pat. No. 5,583,312 (hereinafter referred to as the '312 patent) entitled COLD GAS EJECTOR RACK, issued Dec. 10, 1996, assigned to the assignee of the present application and incorporated herein by reference. The '312 patent describes a pressurization system capable of servicing one or more store release systems, which system uses air or one of any number of clean, non-pyrotechnic pressurized gases both as the energy source and energy transfer medium. Preferably, the aircraft contains a miniature compressor and purification system. Ambient air is filtered, dried and stored as an energy medium. Using purified air eliminates the excessive cleaning burden imposed when using pyrotechnics, and also eliminates the sealing problems associated with hydraulics.

As described in detail in the '312 patent, the ejection system includes an on-board source of pressurized non-pyrotechnic gas, at least one release mechanism for mounting the store on the aircraft, and an actuation system for driving the release mechanism between closed and open positions. The actuation system includes an accumulator for receiving and storing pressurized gas from a source which may or may not be located on-board the aircraft. Actuation of a control valve causes a primary valve to move in a linear direction from a closed position to an open position (see FIG. 3 of the '312 patent). This movement allows pressurized gas, i.e. air, to flow from the accumulator into the actuation chamber, forcing a separate, hook release piston to move in a linear direction as shown in the same FIG. 3 of the '312 patent. As a result, the pressurized gas forces a ram attached to the hook release piston to engage and unlock the hooks holding the stores to the rack. Pressurized gas entering the actuator chamber is further capable of exiting from an opposite end of the actuator chamber and flowing into one or more feed tubes that deliver the pressurized gas into engagement with thrust pistons, wherein the pressurized gas causes the thrust pistons to forcibly eject the newly unlocked stores from the rack.

While the ejection system disclosed in the '312 patent provides a significant improvement over earlier pyrotechnic ejection systems due to a substantial reduction in the amount of required maintenance that needs to be performed as compared to the maintenance performed on a pyrotechnic driven ejection system, it has been discovered that by employing a pneumatically powered primary valve reciprocating along a first axis and a separate release piston reciprocating along a second, non-aligned axis as disclosed in the '312 patent, there is a significant reduction in the usable volume of the accumulator. This reduction in volume occurs due to the fact that the primary valve extends into a portion of the volume that would otherwise be available to the accumulator. In order for the accumulator to accommodate enough pressurized gas to provide sufficient force to unlock the hooks and forcibly eject the stores, the volume of the accumulator needs to be increased. This is achieved by increasing the outer surface area of the accumulator, as shown by the shape of accumulator 22 surrounding the actuator assembly in FIG. 2 of the '312 patent, making it difficult for the pneumatic ejection system described in the '312 patent to occupy the same breech volume as occupied by a conventional pyrotechnic cartridge ejection system. In effect, the ejection system disclosed in the '312 patent is able to reduce the overall maintenance requirements of the actuator assembly at the unsatisfactory cost of an increase in size of the accumulator. As a result, the ejection system may not fit in a rack previously designed to employ a pyrotechnic cartridge without significant redesign.

Based on the above and foregoing, it can be appreciated that there presently exists a need in the art for an ejection system actuator mechanism that utilizes pneumatic pressure to forcibly eject stores from their respective racks while still fitting within a conventional breech volume initially designed for pyrotechnic cartridges. The successful solution should maximize the pneumatic pressure while, at the same time, minimizing both the volume and complexity of the actuator mechanism. The present invention provides a successful solution and thereby fulfills this need in the art.

SUMMARY OF THE INVENTION

The present invention encompasses an integral primary valve and release ram assembly wherein the primary valve member is disposed within a fluid chamber and attached to a release ram positioned outside the fluid chamber for joint, reciprocating movement of the valve member and the release ram assembly between open and closed positions. A solenoid control valve assembly is preferably employed to initiate movement of the primary valve and release ram assembly along a common longitudinal axis. The primary valve member functions both as a valve adaptable for controlling the flow of pressurized gas and as a release piston initiating and controlling movement of the release ram, thereby completely eliminating the need for a separate release piston assembly. An accumulator containing a quantity of pressurized gas, preferably compressed air, is in continuous fluid communication with the front end of the fluid chamber containing the primary valve. At least one feed tube extends from a location adjacent the front end of the fluid chamber to one or more thrust pistons.

When it is desired for the integral primary valve and release ram assembly to be in its closed position, the solenoid control valve is set to provide direct fluid communication between a back end portion of the fluid chamber and pressurized gas stored in the accumulator. Pressurized gas entering the back end portion of the fluid chamber acts against the back side of the primary valve, forcing the primary valve into contact with its valve seat. When the primary valve is its closed position, passageway from the front end of the fluid valve to the feed tube is blocked, preventing pressurized gas from flowing from the accumulator through the fluid chamber to the feed tube.

When it is desired to open the primary valve, a signal is sent to change the solenoid valve to its open position, establishing direct fluid communication between the back end portion of the fluid chamber and the atmosphere. As pressurized gas in the fluid chamber vents to the atmosphere, a pressure imbalance is created in the fluid chamber across the primary valve, causing the primary valve to move towards the back end portion of the fluid chamber. In effect, the pressure imbalance causes the primary valve to unseat from its valve seat and open the fluid passageway from the fluid chamber into the feed tube. As the primary valve continues to move towards the back end of the fluid chamber, additional pressurized gas is able to enter the fluid chamber from the accumulator increasing the speed at which the primary valve moves toward the back end of the fluid chamber. Because the release ram is attached for joint movement with the primary valve, the ram rapidly moves into engagement with and unlocks the hooks holding the stores to the rack. After the primary valve member separates from its valve seat, pressurized gas occupying the front end of the fluid chamber is free to flow into the feed tube leading to the thrust pistons.

The various fluid passageways created by the primary and control valves are carefully designed to assure that the release ram engages and moves the hooks to their unlocked positions before a sufficient quantity of pressurized gas is available to engage the thrust pistons to forcibly eject the stores. After the thrust pistons forcibly eject the stores, the solenoid control valve may be signaled to return to its closed position or left in its open position until the aircraft has returned to base. While a solenoid actuated control valve is preferred, any type of control valve, such as a hydraulic or even a mechanically actuated control valve assembly may be employed within the scope of the present invention.

BRIEF DESCRIPTION OF THE DRAWINGS

These and various other features and advantages of the present invention will be readily understood with reference to the following detailed description read in conjunction with the attached drawings, in which.

DETAILED DESCRIPTION OF THE INVENTION

The present invention provides an integral primary valve and release ram actuator assembly adaptable for use in a pneumatic ejection system of the type described in the '312 patent. For purposes of convenience, the present invention will be described in conjunction with the ejection system described in the '312 patent, however, the present invention is in no way intended to be limited to use with any particular pneumatic ejection system. The type of known pneumatic actuator assembly described in the '312 patent will first be discussed in order to better understand and appreciate the improvements and advantages of the present invention.

Figure 1:
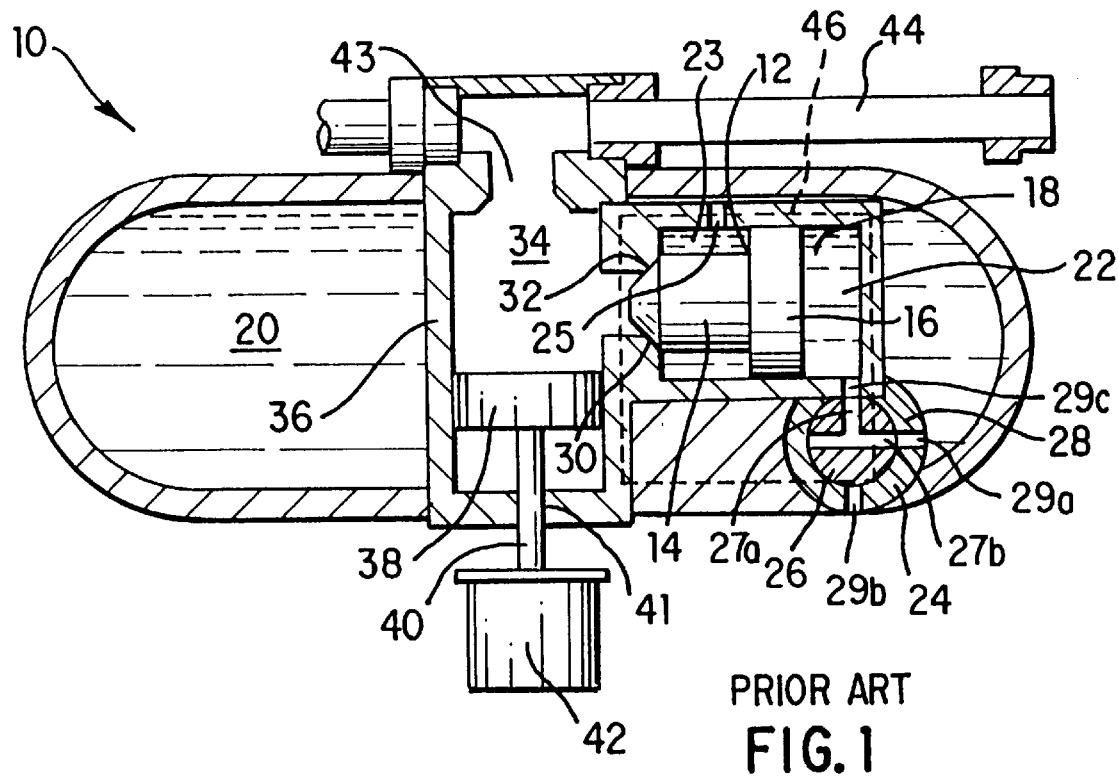
FIG. 1 is a cross-sectional view of a pneumatic accumulator and valve with a separate release piston as employed in the ejection system described in the '312 patent as shown in its closed position.

Pneumatic actuator assembly 10, as disclosed in the '312 patent, is depicted in FIG. 1 in its closed position. Actuator assembly 10 includes a primary valve 12 consisting of a valve stem 14 attached to and extending in a perpendicular direction from a cylindrically-shaped valve head 16. Primary valve 12 is mounted for reciprocating movement within a cylindrically-shaped fluid chamber 18 which, itself, occupies a portion of an accumulator 20 filled with a pressurized gas, preferably compressed air. As valve head 16 reciprocates within fluid chamber 18, a back end portion 22 of fluid chamber 18 extending between a back side of valve head 16 and an end wall of fluid chamber 18 either expands or contracts in volume. In a similar manner, a front end portion 23 of fluid chamber 18 surrounding valve stem 14 also contracts or expands in volume as primary valve 12 moves through fluid chamber 18. Front end portion 23 of fluid chamber 18 is in continuous fluid communication with the pressurized gas in accumulator 20 through conduit 25, allowing pressurized gas from accumulator 20 to fill front end portion 23 until the there is no pressure imbalance between front end portion 23 and accumulator 20.

A control valve assembly 24, preferably actuated by a solenoid actuator, is employed to close or open primary valve 12. Valve assembly 24 includes a movable inner valve member 26 surrounded by an outer sleeve 28. Inner valve member 26 includes a pair of through conduits 27a and 27b joined together to form a continuous, internal passageway extending through inner valve member 26. While the conduits 27a and 27b appear to form a "T"-shaped passageway in FIGS. 1 and 2, these drawings are schematic in nature and are not intended to show the actual shape of the valve and sleeve. Sleeve 28 preferably is formed with three separate fluid conduits 29a, 29b and 29c each extending completely through an outer wall.

One end of conduit 29a is in fluid communication with an interior portion of accumulator 20, while an opposite end of conduit 29a is in fluid communication with hollow interior of sleeve 28 enclosing inner valve member 26. In a similar manner, one end of fluid conduit 29b is in fluid communication with the atmosphere while an opposite end of conduit 29b is in fluid communication with the hollow interior of hollow sleeve 28. Finally, conduit 29c includes one end portion in fluid communication with back end portion 22 of fluid chamber 18 and an opposite end in fluid communication with the hollow interior in sleeve 28. Conduits 29a, 29b and 29c are disposed relative to one another about the surface of sleeve 28 for a specific purpose which will become clear from the following description.

When control valve 24 is in a closed position as shown in FIG. 1, conduit 29a joins with conduit 27b extending through inner valve member 26 while conduit 27a joins with conduit 29c extending through sleeve 28. Pressurized gas within accumulator 20 flows through conduits 29a, 27b, 27a and 29c before filling back end portion 22 of fluid chamber 18. As the pressure increases in back end portion 22, sufficient force is generated to move primary valve 12 through front end portion 23 of fluid chamber 18, causing a conically-shaped front end portion 30 of valve stem 14 eventually to make sealing contact with a mating valve seat 32 in the front end of fluid chamber 18. The pressurized gas occupying the back end portion 22 of fluid chamber 18 maintains primary valve 12 in a closed position, preventing additional pressurized gas already occupying the forward end portion 23 of fluid chamber 18 from reaching a separate fluid chamber 34 formed by a cylindrically-shaped jacket 36. Fluid chamber 34 has a longitudinal axis which is different from a longitudinal axis through fluid chamber 18. In fact, the longitudinal axes are substantially perpendicular to one another.

A release piston 38 is positioned within fluid chamber 34 for reciprocating movement. A rod 40 is attached to the back side of release piston 38 remotely located from primary valve 12 and extends along the longitudinal axis through fluid chamber 34. Rod 40 passes through an opening 41 formed in the back end of jacket 36 and engages a release ram 42. Fluid chamber 34 also includes an opening 43 at its front end oppositely disposed from opening 41. A fluid passageway extends through opening 43 into one or more feed tubes 44 which join conventional thrust pistons, not shown in the present invention but preferably of the type shown in FIG. 2 of the '312 patent. Release piston 38, rod 40 and ram 42 are joined one-to-another for joint, reciprocating movement as piston 38 slides within chamber 34.

When control valve 24 assumes the closed position shown in FIG. 1, no pressure imbalance exists within fluid chamber 34 across release piston 38 and piston 38 tends to remain at rest. However, once control valve 24 moves to an open position shown in FIG. 2, conduit 27b comes into fluid communication with conduit 29b. Pressurized gas occupying back portion 22 of fluid chamber 18 is then able to vent to the atmosphere. Because front end portion 23 of chamber 18 is in continuous fluid communication with accumulator 20, pressurized gas occupying front end portion 23 creates a pressure imbalance within fluid chamber 18 across valve 12, forcing valve 12 to move away from its valve seat 32. The pressurized gas occupying the front end portion 23 of chamber 18 is then free to flow into the front end portion 34a of fluid chamber 34. As the pressurized gas fills front end portion 34a, increasing pressure is exerted against release piston 38, causing it to move through chamber 34 towards opening 41. This movement serves to move rod 40 through opening 41 and moving attached ram 42 into engagement with the hook release mechanism to unlock the hooks and release the stores, as more fully described in the '312 patent.

Figure 2:
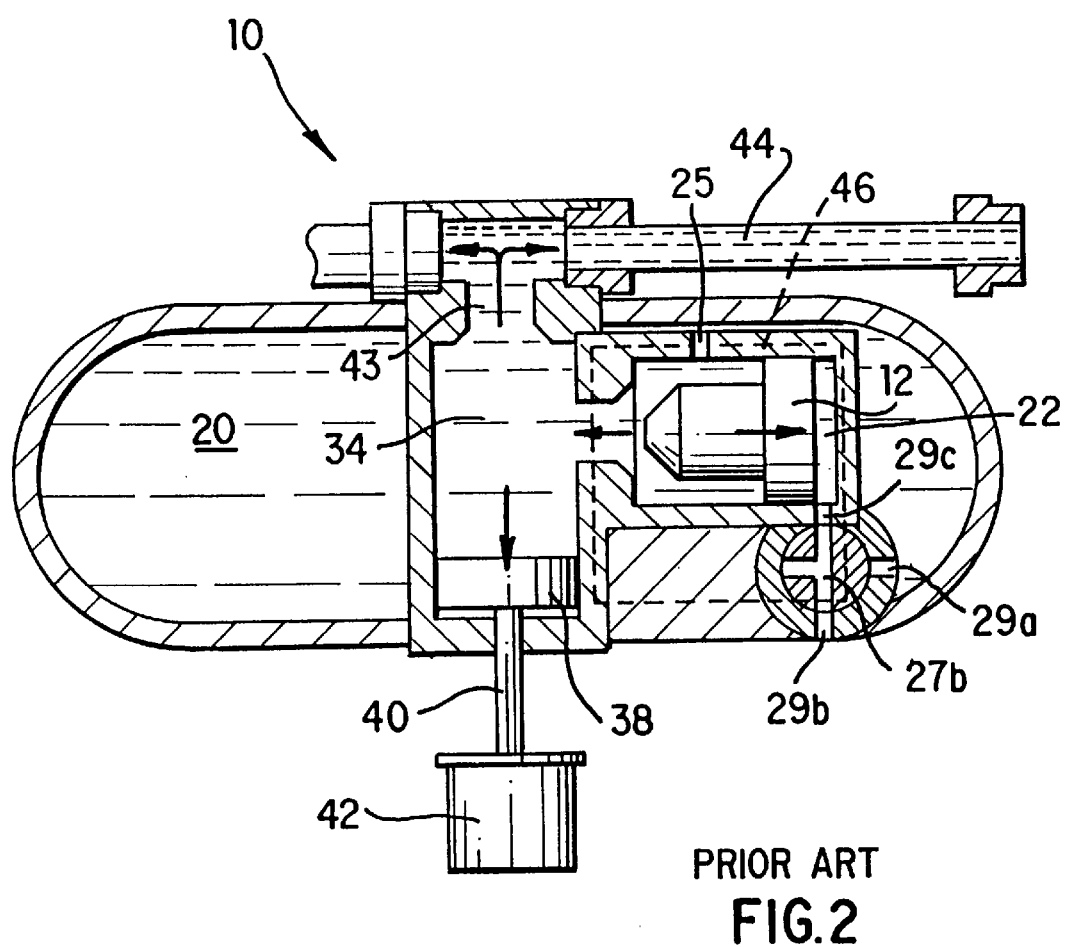
FIG. 2 is a cross-sectional view of the assembly of FIG. 1 as shown in its open position.

The problem with the pneumatic actuator mechanism described in the '312 patent and shown in FIGS. 1 and 2 resides in the fact that only release piston 38 occupies fluid chamber 34, with primary valve 12 located within its own, separate fluid chamber 18 which takes up a significant portion of the available volume of accumulator 20. As a result, the volume occupied by primary valve 12 decreases the volume of accumulator 20 available to hold pressurized gas, thereby reducing the force available for unlocking the hooks and ejecting the stores from the rack.

A further problem associated with the known actuator assembly shown in FIGS. 1 and 2 resides in the use of separate primary valve and release piston assemblies. Because the primary valve and the release piston are separate members, the fluid passageways must be carefully designed and constructed to allow the primary valve to properly time the movement of the separate release piston and attached release ram. Utilizing separate members reciprocating along different longitudinal axes introduces a higher level of design complexity as compared with eliminating the release piston altogether and having the primary valve and release ram disposed for joint linear movement along a common longitudinal axis.

In order to overcome the problems associated with the actuator assembly shown in FIGS. 1 and 2 and described above, the present invention has devised a unique pneumatic actuator assembly wherein the release piston is eliminated and the primary valve and the release ram are joined for reciprocal motion along a common longitudinal axis so that the release ram engages and unlocks the hook retaining mechanism before forcibly ejecting the stores from the aircraft.

Figure 3:
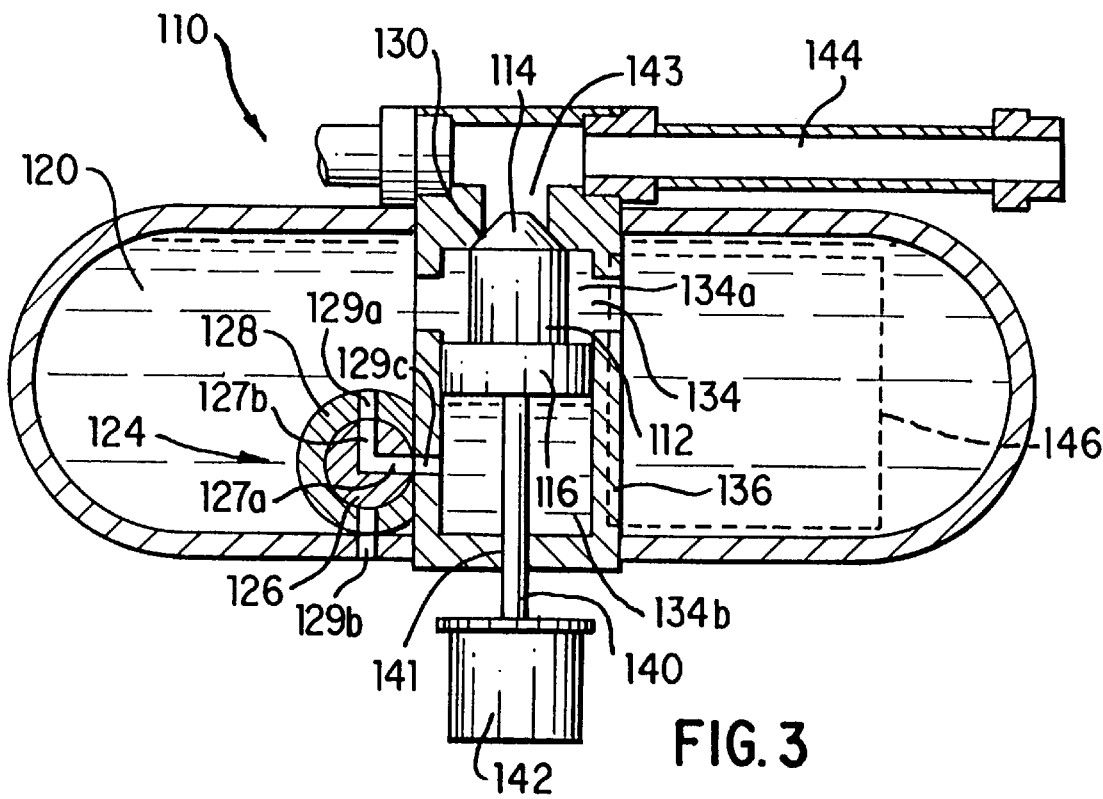
FIG. 3 is a cross-sectional view of an improved pneumatic accumulator and valve with release piston constructed in accordance with the present invention as shown in its closed position.
Figure 4:
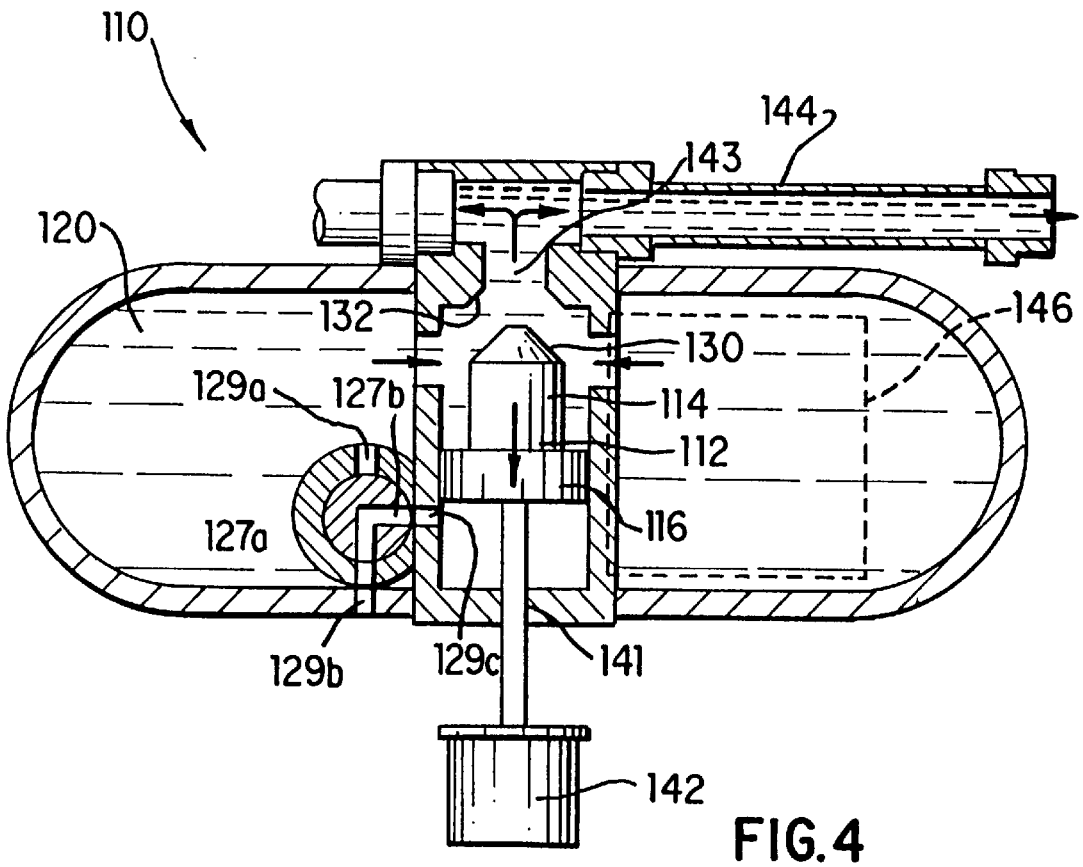
FIG. 4 is a cross-sectional view of the assembly of FIG. 3 as shown in its open position.
Figure 5:
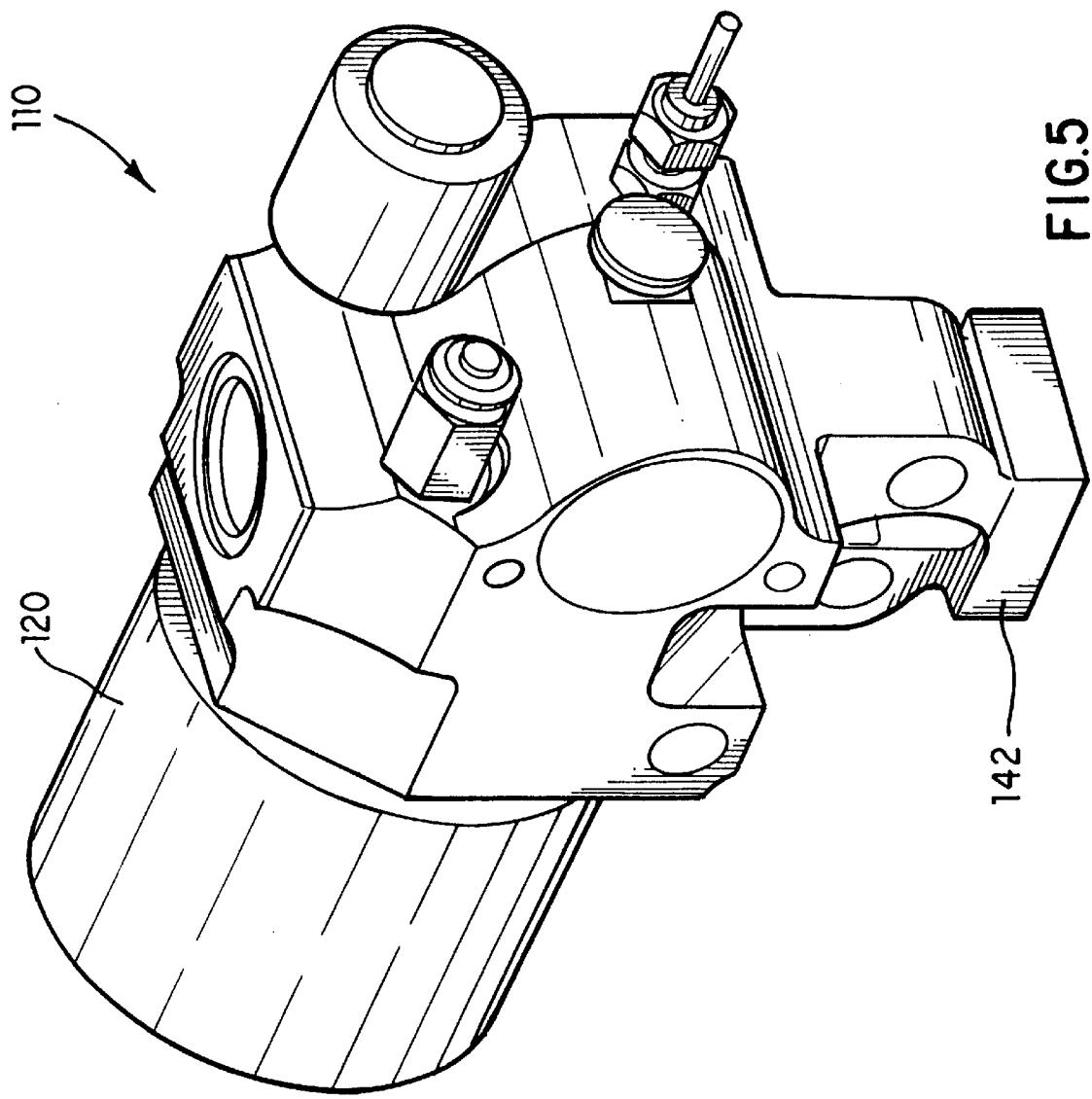
FIG. 5 is a perspective view showing the relative locations of the accumulator and actuator assembly of FIG. 3.

With reference to FIGS. 3, 4 and 5, applicant's unique pneumatic actuator system will now be described. Where possible, elements performing substantially the same function as previously described will be identified with the same last two numerals.

The pneumatically driven ejection actuator assembly 110 is shown in perspective in FIG. 5, wherein an accumulator 120 having a cylindrical, bottle shaped configuration extends outwardly from the main body of actuator 110. Referring now to FIGS. 3 and 4, actuator 110 includes a cylindrical jacket 136 which partially encloses and forms a central fluid chamber 134.

A primary release valve 112 is positioned for reciprocating along a longitudinal axis extending through fluid chamber 134. Primary valve 112 includes an elongated valve stem 114 and a cylindrical valve head 116, with valve stem 114 attached to and extending outwardly from a front side of valve head 116. An outer, cylindrical surface of valve head 116 contacts the cylindrical inner surface of jacket 136, forming a seal that prevents pressurized gas from moving across valve head 116 between a front end portion 134a and a back end portion 134b of chamber 134. Valve stem 114 includes a conically-shaped front end 130 extending within the front end portion 134a of chamber 134. Front end 130 of valve stem 114 is disposed to engage and mate with a recessed valve seat 132 formed in jacket 136. Attached to the back side of valve head 116b is a rod 140 which extends from valve head 116, through opening 141 and into attachment with a release ram 142.

Accumulator 120 is in continuous fluid communication with the front end portion 134a of fluid chamber 134. Jacket 136 includes a back wall having an opening 141. Jacket 136 also includes an opening 143 extending through valve seat 132 at the front end of fluid chamber 134. Preferably openings 141 and 143 face each other along the longitudinal axis extending through chamber 134. Forward opening 143 engages at least one feed tube 144 servicing one or more thrust pistons, not shown in the present invention, but preferably of the type shown in FIG. 2 of the '312 patent.

As primary valve 112 reciprocates within fluid chamber 134, the front end 130 of valve stem 114 either engages or disengages from the mating valve seat 132, thereby selectively closing or opening a fluid passageway extending from fluid chamber 134, through opening 143 and into feed tube 144.

A solenoid control valve assembly 124 adaptable for selectively opening and closing primary valve 112 is positioned within accumulator 120, and located adjacent to a wall of jacket 136. Solenoid control valve 124 preferably includes an inner valve member 126 enclosed by a hollow sleeve 128.

A pair of fluid conduits 127a and 127b are joined together to form a continuous, fluid passageway extending through inner valve member 126. While valve member 126 is depicted in FIGS. 3 and 4 as circular with the continuous passageway having an "L"-shaped configuration, the drawing is only intended to be a schematic representation of inner valve 126 and conduits 127a and 127b. In actuality, the inner valve member may be formed as an elongated rod with a number of lands arranged to selectively open and close conduits extending through the hollow sleeve, in order to selectively form fluid passageways through valve assembly 124. The conduits extending through inner valve member 126 can be of any desired shape, provided proper fluid passageways are created between the accumulator 120, fluid chamber 134 and the atmosphere as will be explained.

Hollow sleeve member 128 is formed with separate fluid conduits 129a and 129b each extending through sleeve 128 into an interior space occupied by inner valve member 126. The conduits are constructed such that one end of conduit 129a is in fluid communication with an interior portion of accumulator 120, while an opposite end is in fluid communication with the interior opening formed within sleeve 128, thereby forming a connecting passageway between accumulator 120 and the interior of opening within sleeve 128. In a similar manner, one end of conduit 129b is in fluid communication with the atmosphere, while the opposite end extends into the interior of sleeve 128, thereby forming a vent passageway between inner valve member 126 and the atmosphere. A third conduit 129c extends through jacket 136 with one end in fluid communication with the back end portion 134b of fluid chamber 134 and an opposite end in fluid communication with the interior portion of sleeve 128, thereby forming a release passageway between fluid chamber 134 and inner valve member 126.

Conduits 129a, 129b and 129c are arranged such that when solenoid control valve 124 is in a closed position as shown in FIG. 3, the connecting passageway formed by conduit 129a comes into fluid communication with inner passageway formed by conduit 127b joining the inner passageway formed by conduit 127a with release passageway formed by conduit 129c. This creates a continuous fluid passageway extending from accumulator 120, through solenoid control valve 124 into the back end portion 134b of fluid chamber 134. Pressurized gas flowing from accumulator 120 into back end portion 134b forces valve 112 to move along its longitudinal axis until the conically-shaped forward end 130 of valve stem 114 makes sealing contact with mating valve seat 132. Once valve stem 114 makes sealing contact with valve seat 132, pressurized gas is blocked from flowing between front end portion 134a and feed tube 144 through opening 143.

When solenoid control valve 124 is actuated to move to its open position as shown in FIG. 4, the inner passageway formed by conduit 127b comes into fluid communication with release passageway formed by conduit 129c, and joins the inner passageway formed by conduit 127a and the vent passageway formed by conduit 129b. This creates a continuous fluid passageway from the back end portion 134b of fluid chamber 134, through solenoid control valve 124 to the atmosphere. This allows pressurized gas occupying the back end portion 134b of fluid chamber 134 to vent to the atmosphere, creating a pressure imbalance in fluid chamber 134 across primary valve 112. The pressurized gas occupying the forward portion 134a causes primary valve 112 to move along its longitudinal axis towards the back end of fluid chamber 134, separating the front end 130 of valve stem 114 from its valve seat 132. Continued movement of primary valve 112 serves to drive attached release ram until it unlock the hooks holding the stores in their racks. Additional pressurized gas from accumulator 120 flows into and through front end portion 134a of chamber 134 and then flows through opening 143 and into feed tube 144 leading to thrust pistons not shown but similar to the those employed in the '312 patent.

Because primary valve 112 is aligned with and attached to release ram 142 by means of rod 140, it is capable of functioning as both the primary valve 12 and separate release piston 42 required in the '312 patent. By joining the release ram 142 for movement along a common longitudinal axis with primary valve 112, the need for a separate release piston is eliminated. While the ejection system of the '312 patent and the present invention each provides a pneumatic actuator capable of unhooking and forcibly ejecting stores, the present invention achieves a significant advantage in eliminating the need for the primary valve housing to extend into the accumulator. This design allows for maximum accumulator volume within minimum available space. Alternatively, because the need for additional accumulator is eliminated by combining the valve and release ram, it may be possible to reduce in size that portion of the accumulator 20 which previously housed primary valve 12 in the '312 patent as indicated by the lines 46 in FIG. 1 and 146 in FIG. 4. Furthermore, by completely eliminating the release piston, the overall complexity of the assembly is significantly reduced, thereby increasing the operating reliability as compared to known pneumatic actuator assemblies.

Although various embodiments of the present invention have been described in detail hereabove, it should be clearly understood that many variations and/or modifications of the basic inventive concepts herein taught which may appear to those skilled in the pertinent art will still fall within the spirit and scope of the present invention as defined in the appended claims.

What is claimed is:

1. A pneumatic actuation assembly adaptable for use as part of an ejection system capable of releasing and forcibly ejecting a store from an aircraft, and comprising:

an accumulator for receiving and storing a quantity of pressurized gas;

a primary valve mounted for reciprocating movement within a fluid chamber between open and closed positions, wherein the fluid chamber includes a front end portion in fluid communication with the pressurized gas from the accumulator, and a back end portion in selective fluid communication either with the pressurized gas from the accumulator or with atmospheric pressure, depending on whether the primary valve is in its open or closed position;

a release ram attached to the primary valve for joint movement along a common longitudinal axis: and a control valve device for initiating movement of the primary valve from its closed position to its open position, whereby pressurized gas in the back end portion of the fluid chamber is vented to the atmosphere, allowing pressurized gas occupying the front end portion of the fluid chamber to initiate movement of the primary valve though the back end portion of the fluid chamber until the release ram attached to the primary valve engages and moves the hook release mechanism from a locked to an unlocked position, thereby releasing the store from the aircraft.

2. The actuation assembly according to claim 1, wherein the forward end portion of the fluid chamber includes a forward opening in fluid communication with a mechanism capable of forcibly ejecting the store from the aircraft.

3. The actuation assembly according to claim 1, wherein a rod extends between and is attached at opposite ends to the primary valve and the ram, respectively.

4. The actuation assembly according to claim 3, wherein the primary valve, the rod and the ram are aligned for joint reciprocating movement along a single longitudinal axis.

5. The actuation assembly according to claim 1, wherein the accumulator encloses the fluid chamber and includes an outer wall having a vent passageway extending the outer wall into fluid communication with the atmosphere.

6. The actuation assembly according to claim 5, wherein the fluid chamber includes a release passageway extending from the back end portion of the chamber into the accumulator.

7. The actuation assembly according to claim 6, wherein the control valve means comprises a solenoid valve assembly located adjacent the fluid chamber and including an inner valve member enclosed by a sleeve member, with a connecting passageway extending from the accumulator through the sleeve member and into fluid communication with the inner valve member.

8. The actuation assembly according to claim 7, wherein movement of the inner valve member serves to selectively block end portions of the vent passageway, the release passageway and the connecting passageway, with the inner valve member further including an internal passageway having spaced apart ends positioned such that one end forms a fluid connection with the release passageway and the other end forms a fluid connection either with the vent passageway or the connecting passageway.

9. The actuation assembly according to claim 8, wherein the primary valve is caused to remain in its closed position as long as the solenoid control valve is positioned such that one end of the internal passageway is in fluid connection with the release passageway and an opposite end of the internal passageway is in fluid connection with the connecting passageway, whereby pressurized gas flows from the accumulator, through the connecting passageway, the internal passageway and the release passageway into the back end portion of the fluid chamber.

10. The actuation assembly according to claim 8, wherein the primary valve is free to move from its closed position to its open position when the solenoid control valve is positioned such that one end of the internal passageway is in fluid connection with the release passageway and an opposite end of the internal passageway is in fluid connection with the vent passageway, whereby pressurized gas vents from the back end portion of the chamber through the release passageway, the internal passageway and though the vent passageway to the atmosphere.

11. The actuation assembly according to claim 8, wherein the internal passageway extending through the inner valve member includes first and second portions extending at an angle to one another.

12. The actuation assembly according to claim 11, wherein the first and second portions of the internal passageway extend at an angle of substantially 90 degrees to one another.

13. A pneumatic actuation assembly comprising:
a primary valve mounted for reciprocating movement within a fluid chamber between open and closed positions, wherein the primary valve includes a front end opening forming a fluid passageway with a release mechanism when the primary valve is in its open position;
a source of pressurized gas in continuous fluid communication with a front end portion of the fluid chamber and in selective fluid communication with a back end portion of the fluid chamber;
a control valve device for selectively venting pressurized gas from the back end portion of the fluid chamber, thereby creating a pressure imbalance across the primary valve, causing the primary valve to move towards the back end portion; and
a release ram engaging a lock mechanism responsive to movement of the primary valve to its open position.

14. The actuation assembly according to claim 13, wherein the primary valve and the release ram are attached to one another for movement along a common longitudinal axis.

15. The actuation assembly according to claim 13, wherein a rod extends between and joins the primary valve and the release ram for joint movement along a common longitudinal axis.

16. The actuation assembly according to claim 13, wherein the source of pressurized gas comprises an accumulator surrounding and enclosing the fluid chamber.

17. The actuation assembly according to claim 13, wherein the control valve device comprises a solenoid valve having an internal passageway with one end in continuous fluid communication with the back end portion of the fluid chamber and an opposite end in selective fluid communication with either the source of pressurized gas for maintaining the primary valve in its closed position or with the atmosphere when initiating movement of the primary valve to its open position.

18. In a stores ejection system of the type adaptable for mounting a jettisonable store on an aircraft, and using an on-board source of pressurized gas for providing the source of energy and the transfer mechanism for an actuation assembly to release and forcibly eject the store, an improvement comprising:
a primary valve included as part of the actuation assembly and positioned for movement in a fluid chamber having an opening at one end and attached to a release ram for joint reciprocal movement along a common longitudinal axis responsive to pressurized gas flowing into or out of a back end portion of the fluid chamber; and
control valve means for selectively creating a fluid passageway between the back end portion of the fluid chamber and either the source of pressurized gas or the atmosphere, whereby pressurized gas moves the primary valve from a closed position in which the front end of the fluid chamber is closed, to an open position in which pressurized gas moves the primary valve, causing the release ram to engage and unlock the stores while pressurized gas flowing from the front end of the fluid chamber forcibly release the stores from the aircraft.

* * * * *